(12) United States Patent
Tanabe

(10) Patent No.: US 6,288,871 B1
(45) Date of Patent: Sep. 11, 2001

(54) THIN FILM MAGNETIC HEAD AND MAGNETIC DISK APPARATUS USING THE SAME

(75) Inventor: Masanori Tanabe, Atsugi (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/478,515

(22) Filed: Jan. 6, 2000

(30) Foreign Application Priority Data

Jan. 8, 1999 (JP) .................................................. 11-003351

(51) Int. Cl.$^7$ ........................................................ G11B 5/31
(52) U.S. Cl. ............................................................ 360/126
(58) Field of Search .................................. 360/126, 317, 360/119, 121, 122, 123, 125

(56) References Cited

U.S. PATENT DOCUMENTS

| | | | |
|---|---|---|---|
| 5,600,519 | * | 2/1997 | Heim et al. ............................ 360/126 |
| 5,774,308 | * | 6/1998 | Ohtsuka et al. ...................... 360/126 |
| 5,966,277 | * | 10/1999 | Koshikawa et al. ................. 360/126 |
| 6,034,847 | * | 3/2000 | Komuro ................................ 360/126 |
| 6,061,212 | * | 5/2000 | Honma ................................. 360/126 |
| 6,105,238 | * | 8/2000 | Chesnutt et al. ................... 29/603.14 |
| 6,128,166 | * | 10/2000 | Tanaka et al. ........................ 360/317 |
| 6,150,045 | * | 11/2000 | Saito et al. ............................ 428/692 |
| 6,178,065 | * | 1/2001 | Terunama ............................. 360/126 |
| 6,191,919 | * | 2/2001 | Cates et al. ...................... 360/130.21 |
| 6,195,232 | * | 2/2001 | Cohen .................................... 360/126 |
| 6,201,670 | * | 3/2001 | Chang et al. ......................... 360/317 |

FOREIGN PATENT DOCUMENTS

| | | |
|---|---|---|
| 5-81614 | 4/1993 | (JP) . |
| 8-249614 | 9/1996 | (JP) . |
| 9-293209 | 11/1997 | (JP) . |
| 11-7608 | 1/1999 | (JP) . |

* cited by examiner

Primary Examiner—David L. Ometz
Assistant Examiner—Franklin D. Altman
(74) Attorney, Agent, or Firm—Mattingly, Stanger & Malur, P.C.

(57) ABSTRACT

A thin film magnetic head which can suppress magnetic saturation at opposite ends of width of a narrow track width to reduce the amount of recording side-fringing onto a recording medium and which can assure a necessary recording magnetic field satisfactorily. Also a magnetic disk apparatus using the head. A second magnetic yoke has a magnetic gap depth over which the spacing of a magnetic gap keeps substantially equal toward a rear portion of the second magnetic yoke, starting at the tip of a second magnetic pole and the spacing between a first magnetic yoke and the second magnetic yoke is increased toward the rear portion, starting at a position corresponding to the magnetic gap depth. The second magnetic pole of the second magnetic yoke has in the track width direction a width for recording a signal on a track width of the recording medium. The width keeps constant over a predetermined length toward the rear portion, starting at the second magnetic pole tip and spreads monotonically toward the rear, starting at a position corresponding to the predetermined length. The predetermined length terminating in the spread start position of the width of the second magnetic yoke is set to be shorter than the magnetic gap depth.

27 Claims, 8 Drawing Sheets

INVENTION

THIN FILM MAGNETIC HEAD AND MAGNETIC DISK APPARATUS USING THE SAME

BACKGROUND OF THE INVENTION

The present invention relates to a narrow track thin film magnetic head and a magnetic disk apparatus carrying the thin film magnetic head and more particularly to the structure of a recording head of the thin film magnetic head.

The thin film magnetic head carried on a high recording density magnetic disk apparatus has been used widely and many proposals to improve the performance have been made. Recently, there is an increasing demand for improvement in the performance directed to high density recording and today, a composite apparatus in which the conventional inductive type recording head and the reproduction head such as highly sensitive MR head are separately incorporated tends to be used generally. The performance of recording and reproduction has been improved remarkably by the aforementioned composite apparatus having the separated heads as well known in the art but from the standpoint of further promotion of improvement in the performance, only the improvement in the MR head or GMR head directed to high sensitivity is insufficient and improvements in the structure of the recording head are particularly important as disclosed in JP-A-08-249614 (corresponding to U.S. Ser. No. 399781 filed on Mar. 6, 1995) making a proposal to promote the performance by improving the structure of the recording head.

SUMMARY OF THE INVENTION

An expedient such as improving the track density or narrowing the track width occupies a factor in increasing the recording density. The expedient is, however, accompanied by problems that a recording magnetic field from the tip of a magnetic gap decreases and magnetic flux is concentrated to opposite ends of track width, leading to magnetic saturation at the opposite ends. To meet demands for the expedient, therefore, it is necessary to show a way to suppress the decrease in recording magnetic field, to suppress the magnetic saturation at the opposite ends of width of a narrow track width so as to reduce the amount of a side-fringing onto a recording medium (the side-fringing is a unwanted spreading of recording pattern caused when information is recorded in excess of the track width in the track width direction as a result of concentration of the magnetic flux to the opposite ends) and to assure a necessary recording magnetic field satisfactorily.

The aforementioned JP-A-08-249614 discloses a proposal to improve recording magnetic field vs recording current characteristics and addresses magnetic saturation in the magnetic yoke, as in the present invention. To describe in greater detail, JP-A-08-249614 discloses a technical idea that in a magnetic yoke shaped to have a width which starts to greatly diverge or spread at a position (flare point) between the magnetic pole tip and a rear portion of the magnetic yoke, the width is gradually spread or increased toward the flare point, starting at a position (zero throat point) which is closer to the magnetic pole tip than the flare point and at which the magnetic gap terminates, in order to cause magnetic saturation to take place substantially simultaneously over a length of the magnetic yoke between the zero throat point and the flare point.

However, the above prior art does not take into consideration problems raised in narrowing the track, failing to refer to magnetic saturation at opposite ends of track width and problems encountered in connection with magnetic saturation at the magnetic pole tip.

An object of the present invention is to provide a thin film magnetic head having a recording head which can suppress magnetic saturation at opposite ends of the width of a narrow track width to reduce the amount of the side-fringing onto a recording medium and which can assure a necessary recording magnetic field satisfactorily and to provide a magnetic disk apparatus carrying the magnetic head.

To accomplish the above object, a thin film magnetic head according to one aspect of the present invention comprises:

a first magnetic yoke having a first magnetic pole facing a magnetic recording medium;

a second magnetic yoke having a second magnetic pole so disposed as to define a magnetic gap between the second magnetic pole and the first magnetic pole and forming at its rear portion a magnetic circuit which magnetically short-circuits to the first magnetic yoke;

a conductor coil formed between the first and second magnetic yokes; and an insulating layer for insulating the conductor coil from the first and second magnetic yokes, wherein the second magnetic yoke has a magnetic gap depth (GD) over which the spacing of the magnetic gap defined between the first and second magnetic yokes keeps substantially equal toward the rear portion of the second magnetic yoke, starting at the tip of the second magnetic pole and the spacing between the first and second magnetic yokes is increased toward the rear portion, starting at a position corresponding to the magnetic gap depth extending from the second magnetic pole tip, to house the conductor coil and the insulating layer;

the second magnetic pole of the second magnetic yoke has a width (TW) in the track direction for recording a signal on a track width of the recording medium;

the width (TW) keeps constant over a predetermined length (PH) toward the rear portion, starting at the second magnetic pole tip and spreads monotonically toward the rear, starting at a spread start position corresponding to the predetermined length (PH) from the second magnetic pole tip; and the predetermined length (PH) terminating in the spread start position of the width (TW) of the second magnetic yoke is shorter than the magnetic gap depth (GD)

DESCRIPTION OF THE PREFERRED EMBODIMENTS

Structure, function and operation of narrow track thin film magnetic heads according to embodiments of the present invention will now be described with reference to the accompanying drawings. A magnetic disk apparatus using the thin film magnetic head is schematically illustrated in FIG. 1.

Figure 1:
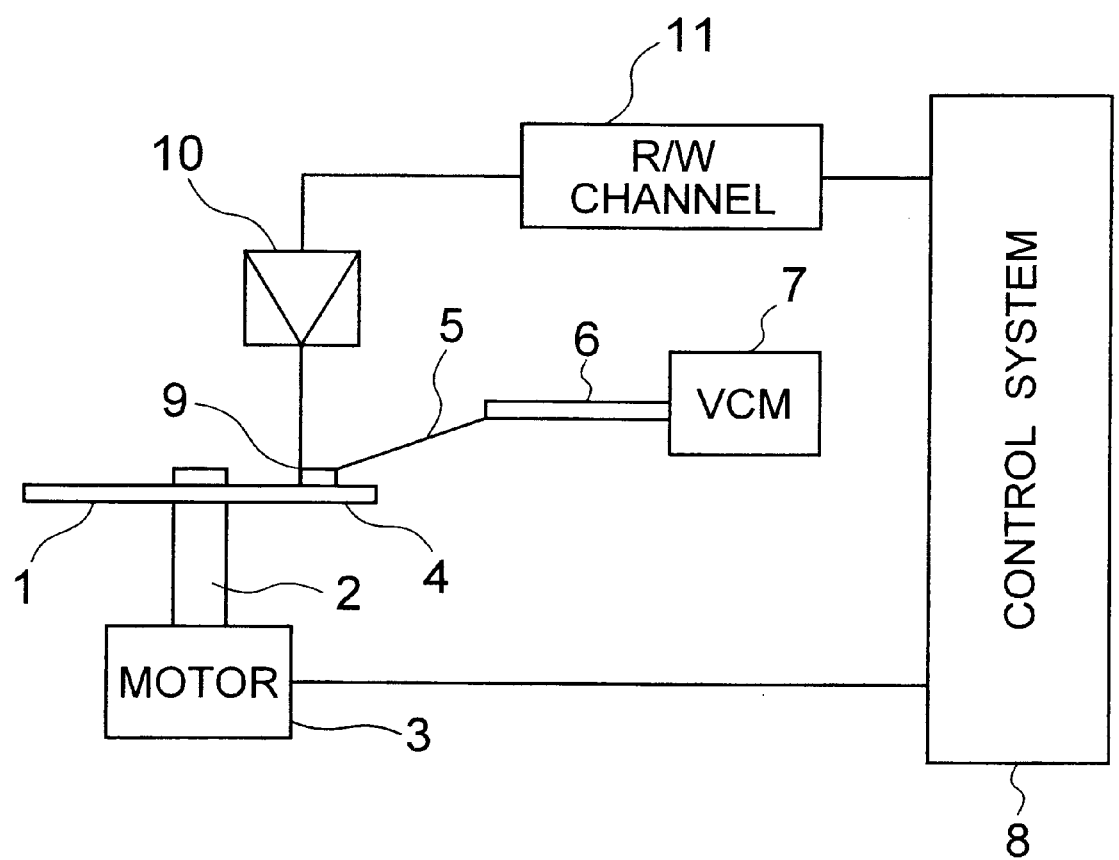
FIG. 1 is a diagram schematically showing a magnetic disk apparatus using a thin film magnetic head.

Referring to FIG. 1, a disk-shaped recording medium 1 is driven to rotate by a motor 3 through a spindle 2. A head slider 4 is supported by a suspension 5 and an actuator arm 6 and is set to a desired position on the medium 1 through a drive system 7 such as VCM (voice coil motor) and a control system 8. A thin film magnetic head 9 is formed on the head slider 4 in such a manner that a magnetic pole of a recording head and a magnetic gap of a reproduction head such as MR head or GMR head face the recording medium. Signals from the recording/reproduction heads are sent through a preamplifier 10 so as to be processed by a read/write channel 11 and the control system 8 comprised of a logical control circuit, memories and a CPU.

Figure 2:
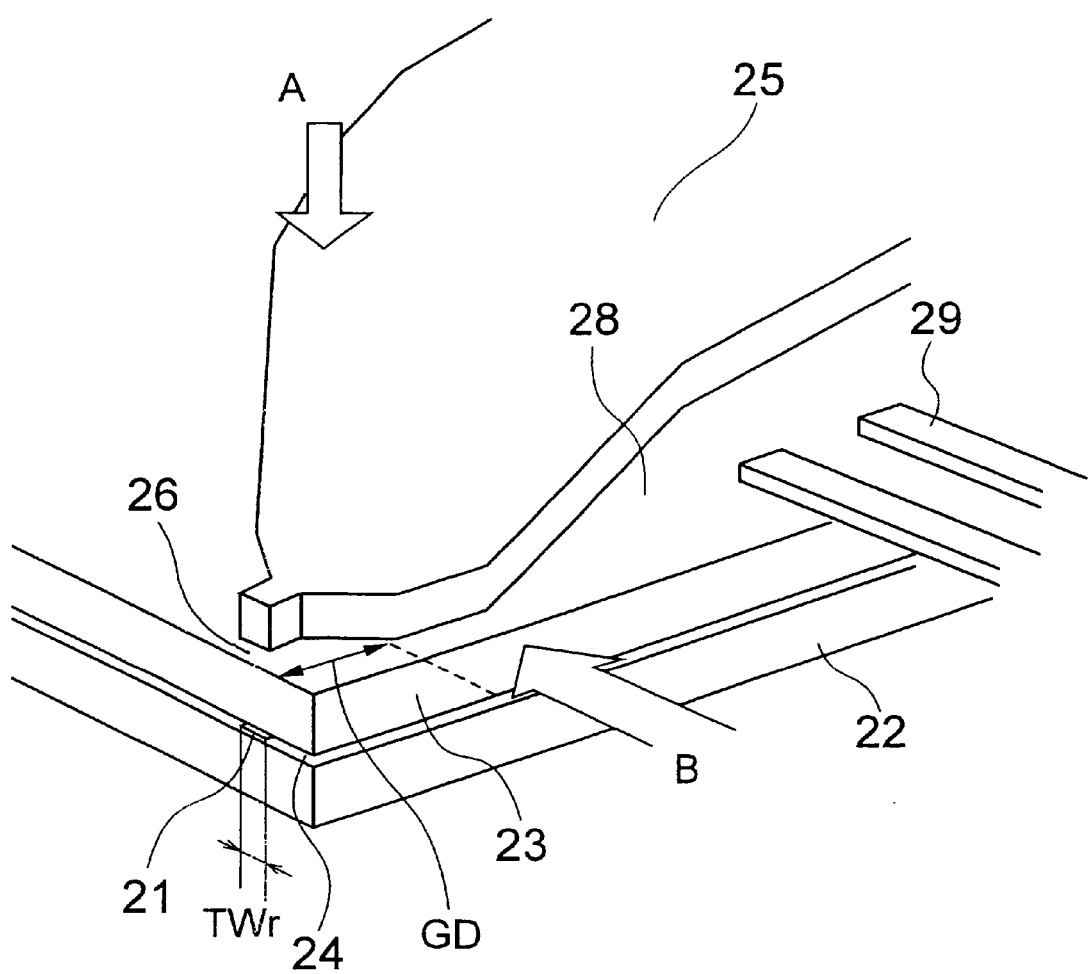
FIG. 2 is a perspective view showing the structure of the thin film magnetic head.

Referring to FIG. 2, the thin film magnetic head 9 is constructed as shown therein in perspective view form. In FIG. 2, the thin film magnetic head 9 comprises a reproduction head and a recording head 250. The reproduction head has a lower shield 22, an upper shield 23 and a MR head or GMR head 21 formed in a reproduction gap 24 defined by the lower shield 22 and upper shield 23. The MR or GMR head 21 is insulated from the lower and upper shields by an insulating layer. The recording head 250 is formed above the reproduction head. Denoted by TWr is a track width of the reproduction head.

The recording head 250 has a first magnetic yoke in the form of the upper shield 23 and a second magnetic yoke 25. The second magnetic yoke 25 is formed above the first magnetic yoke 23 to face the first magnetic yoke 23 in parallel therewith through a recording gap 26 over a distance of gap depth GD. A rear portion of the second magnetic yoke 25 surrounds a conductor coil 29 while being insulated therefrom by an insulating layer 28 and is magnetically short-circuited (not shown) to the first magnetic yoke 23. Here, the magnetic gap depth GD means a length extending from the magnetic pole tip over which the spacing of the magnetic gap between the first and second magnetic yokes keeps substantially equal (see structure illustrated in FIG. 3).

Figure 3:
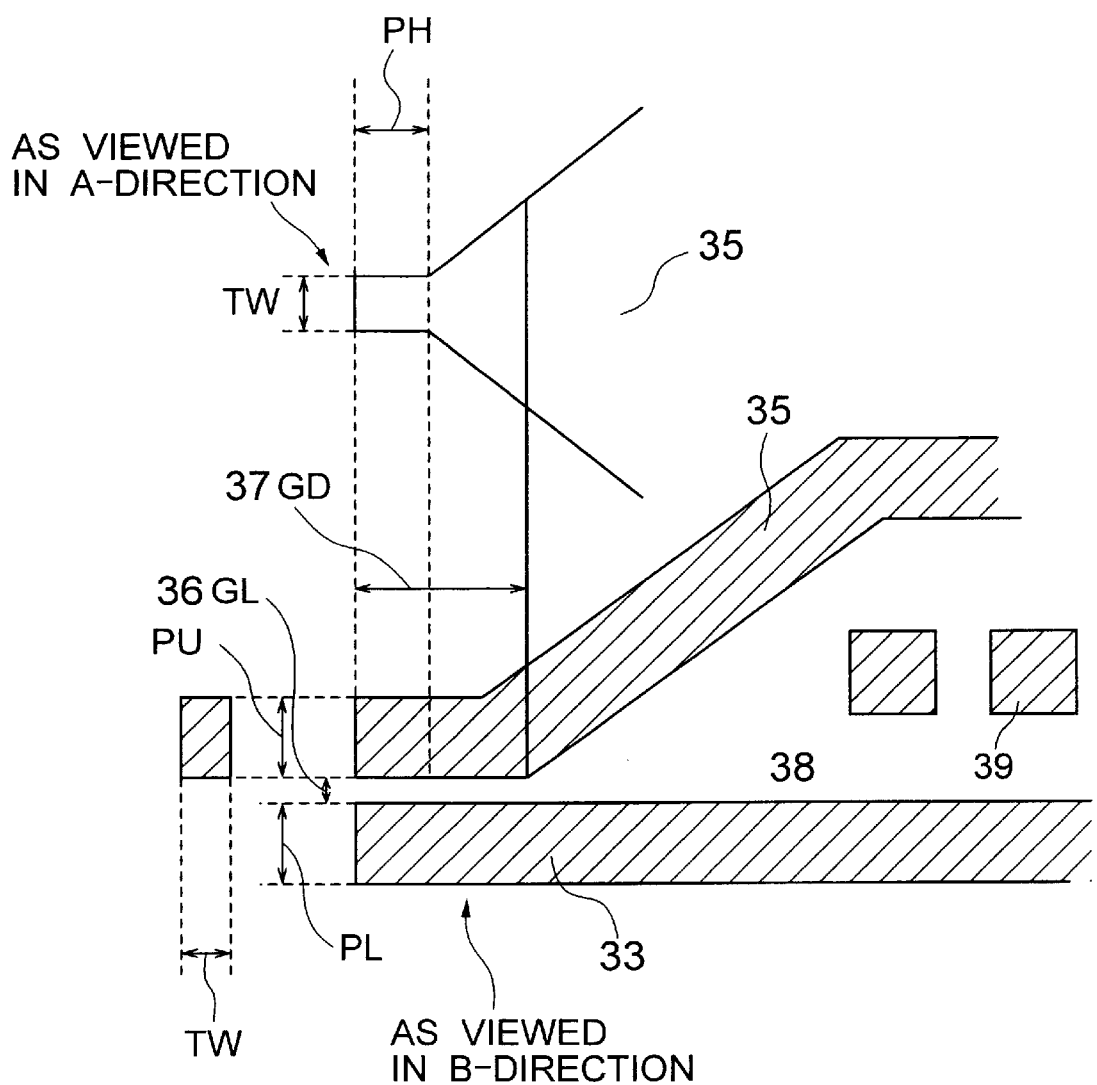
FIG. 3 is a diagram showing, in plan view form, the thin film magnetic head of FIG. 2 as viewed in A direction and showing, in sectional view form, the FIG. 2 thin film magnetic head as viewed in B direction.

Referring to FIG. 3, the thin film magnetic head of FIG. 2 as viewed in A direction is depicted in a plan view form and as viewed in B direction is depicted in a sectional view form. As shown in the sectional diagram of FIG. 3 in the B direction, a write gap (GL) 36 in the form of a non-magnetic insulating layer overlies the first magnetic yoke 33 having a thickness of PL over a distance of the gap depth (GD) 37 so as to be sandwiched in between the first magnetic yoke 33 and the second magnetic yoke 35 having a thickness of PU and a track width of TW. The conductor coil 39 made of a material such as copper is formed between the magnetic yokes 33 and 35 through the insulating layer 38 made of a material such as photoresist.

As shown in the plan view diagram of FIG. 3 in the A direction, the width (in the track width direction) of the second magnetic yoke 35 starts to diverge or spread smoothly or monotonically from the track width TW at a position which is PH distant from the magnetic pole tip toward the conductor coil. The present embodiment of the invention features that the position at which the width of the second magnetic yoke 35 starts to diverge (PH distant from the magnetic pole tip toward the conductor coil) is shorter than the gap depth GD.

In other words, by causing the width of the second magnetic yoke 35 to spread at the position within the range of the gap depth GD, the amount of the whole magnetic flux induced in accordance with a signal current applied to the conductor coil 39 can be increased (as compared to the prior art in which the width of the second magnetic yoke starts to spread at a position being closer to the conductor coil than the end of the gap depth GD, the magnetic reluctance of the whole magnetic circuit is reduced to cause the amount of the whole flux in the magnetic yoke to increase by a reduction amount) to increase the amount of magnetic flux which goes round to the first and second magnetic yokes 33 and 35 (any magnetic path is not established through the recording medium but a magnetic path is set up directly through the first and second magnetic yokes), so that the magnetic flux reaching the magnetic pole tip of the magnetic gap 36 can be adjusted suitably.

Through this, an effective recording magnetic field applied to the recording medium can be assured and at the same time, magnetic saturation due to flux concentration to opposite ends of track width can be suppressed in the magnetic gap 36 to reduce a magnetic field which leaks laterally of the opposite ends of track width (in a direction substantially orthogonal to a vertical direction from the magnetic pole tip to the recording medium, that is, in the track width direction) This places magnetic recording onto the recording medium 1 in such good condition that the side-fringing in the track width direction can be mitigated even in the case of the narrow track and curving of a magnetization pattern near the opposite ends of track width can be suppressed.

In other words, by adjusting the predetermined length (PH) up to or terminating in the spread start position, the amount of induced write magnetic flux which goes round directly to the first and second magnetic yokes without passing through the recording medium can be adjusted in the region of the magnetic gap depth (GD), thereby ensuring that saturation of the induced magnetic flux can be suppressed at the opposite ends of track width of the second magnetic pole to reduce the amount of the side fringing onto the recording medium can be reduced at the opposite ends of track width and to suppress curving of the magnetization pattern near the opposite ends of track width.

Figure 4A:
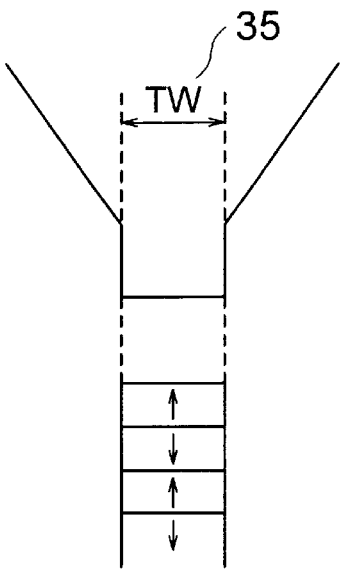
FIG. 4A is a diagrammatic representation of magnetization condition in a recording medium in the present invention.
Figure 4B:
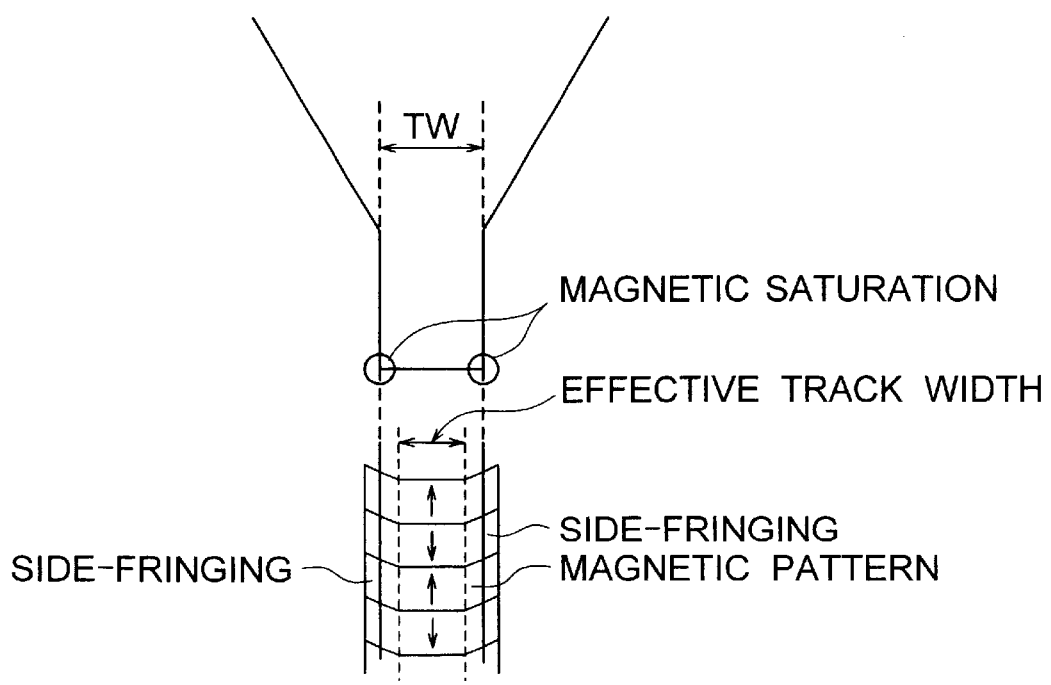
FIG. 4B is a diagrammatic representation of magnetization condition in a recording medium in the prior art.

The recording conditions described as above are diagrammatically indicated in FIGS. 4A and 4B. In the figures, magnetization condition of the recording medium 1 subjected to recording by way of the track width TW of the second magnetic yoke 35 is diagrammatically shown. FIG. 4B illustrates a conventional magnetization pattern, demonstrating that in recording, the magnetization pattern at the opposite ends of track width on the medium is wider than the track width TW, leading to the side-fringing and, besides, the magnetization pattern is remarkably curved in the vicinity of the opposite ends of track width. This curving makes the effective track width considerably smaller than the track width TW of the second magnetic yoke (the curved magnetization pattern causes the recording phase to differ).

Contrarily, according to the present embodiment of the invention, the magnetization pattern can be formed substantially linearly up to the opposite ends of the track width TW as shown in FIG. 4A, demonstrating that narrowing of the effective track width can be suppressed.

Figure 5A:
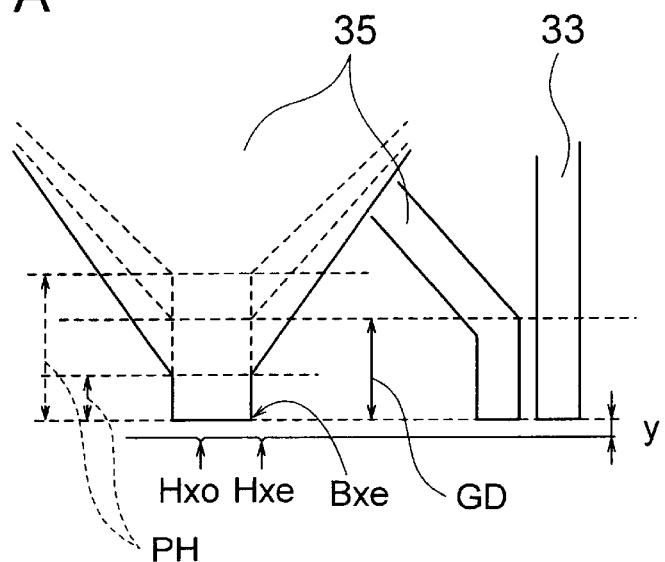
FIG. 5A is a diagram for explaining a width spread start position in a second magnetic yoke according to an embodiment of the invention.
Figure 5B:
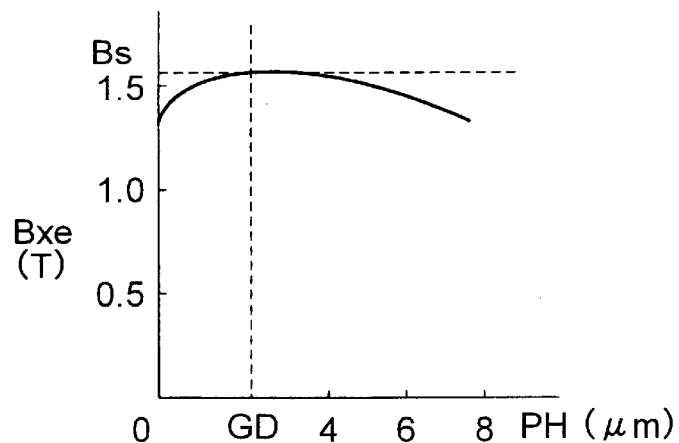
FIG. 5B is a graph showing a relation between the width spread start position and the magnetic flux density at the end of the track width in the magnetic pole.
Figure 5C:
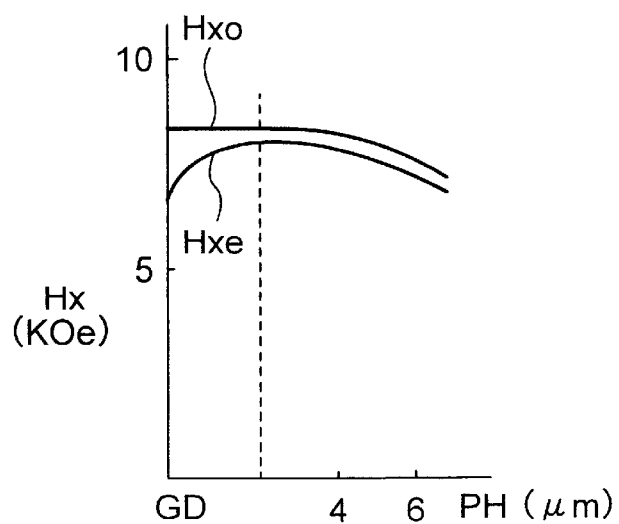
FIG. 5C is a graph showing a relation between the width spread start position and the intensity of recording magnetic field at recording medium position having distance y away from the pole tips.

Referring to FIGS. 5A, 5B and 5C, the width spread start position in the second magnetic yoke and the relation of the width spread start position to the magnetic flux density and to magnetic field intensity at the magnetic pole are illustrated. Especially, FIG. 5A is a diagram for specifying the dimensional relation between the width spread start position PH and the gap depth GD, the intensity of recording magnetic field in the center of the magnetic pole tip and the intensity of recording magnetic field at the opposite ends of width. FIG. 5B graphically illustrates the relation between magnetic flux density Bxe at the opposite ends of track width on the tip of the second magnetic yoke 35, that is, at the ends of the track width in the second magnetic pole and the spread start position PH, and FIG. 5C graphically illustrates the relation of the recording magnetic fields, prevailing in the center and at the opposite ends of the tip of the magnetic gap 36 substantially near the medium, that is, the intensity of the recording magnetic field at a recording medium position having the distance y away from the pole tips, to the aforementioned PH.

According to FIG. 5B, in case when PH, which is the distance between the spread start position and the magnetic pole tip, is changed from a large value to a smaller value, that is, as the PH gradually approaches to the tip from the conductor coil side (rear side), the magnetic flux density Bxe at the opposite ends of the width of the magnetic pole increases toward a saturation value Bs until the Bxe is substantially maximized at the PH being nearly equal to the gap depth GD. Subsequently, as the PH comes into the distance satisfying PH<GD characteristic of the present invention, the magnetic flux density Bxe again decreases. This indicates that by adopting the present invention, the magnetic saturation at the opposite ends of track width on the tip of the second magnetic yoke 35 can be suppressed. With the magnetic saturation suppressed, the side-fringing region occurring at a portion clear of the track width on the medium can be reduced and curving of the magnetization pattern near the opposite ends of track width can also be suppressed.

According to FIG. 5C, as the PH gradually approaches to the tip from the rear side, both of magnetic field Hxo near the center of the second magnetic yoke 35 and magnetic field Hxe near the opposite ends of track width and at the recording medium position away from the pole tip by distance y increase until they are substantially maximized near the gap depth GD. Then, as the PH comes into the region proposed by the present invention, the magnetic field Hxo near the center keeps substantially the same level of magnetic field but the magnetic field Hxe near the opposite ends of track width again decreases. Therefore, by adopting the present invention, the magnetic saturation at the opposite ends of track width ends on the tip of the second magnetic yoke 35 can be suppressed, with the result that a leakage magnetic field responsible for the side-fringing of recording expected to occur near the opposite ends of track width on the tip of the second magnetic yoke 35 can be mitigated and the necessary recording magnetic field can be assured satisfactorily.

Structural examples such as concrete dimensional values in the present embodiment are as follows.

The material and thickness (PL) of the first magnetic yoke: 80 NiFe, 2 to 5 $\mu$m;

The material and thickness (PU) of the second magnetic yoke: 46 NiFe, 2 to 5 $\mu$m;

The length and material of the recording gap: 0.4 $\mu$m or less, $Al_2O_3$;

The recording gap depth (GD): 5 $\mu$m or less;

The spread start position PH in the second magnetic yoke: 4 $\mu$m or less;

The track width TW: about 1 $\mu$m;

The reproduction gap length GS: 0.3$\mu$m or less; and

The reproduction track width TWr: about 1 $\mu$m.

With reference to FIGS. 5A, 5B and 5C, an example of a computer simulation was resulted in the saturation magnetic flux density Bs of 1.6T at the opposite ends of the tip of the second magnetic yoke under the conditions below.

The distance y between the pole tips and the recording medium 35 nm;

GD: 2.0 $\mu$m;
GL: 0.2 $\mu$m;
TW: 0.5 $\mu$m;
PU: 3.0 $\mu$m; and
PL: 3.0 $\mu$m.

Referring to FIGS. 6 to 14, there are illustrated applied examples of the present invention which are combined with means for further promoting the effects of this invention. Members having the same function as the members in FIG. 2 are designated by the same reference numerals.

Figure 6:
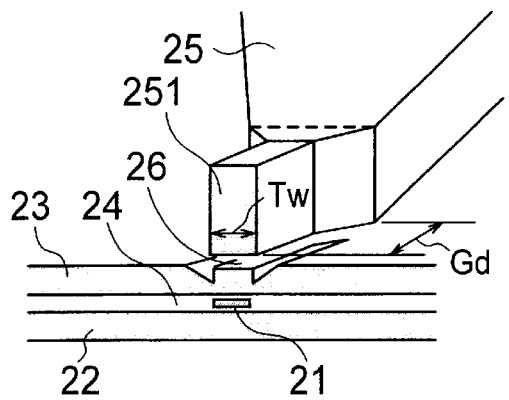
FIGS. 6 to 14 are perspective views, partly sectioned, showing the structure of thin film magnetic heads according to different embodiments of the invention.

FIG. 6 is an example featuring a structure in which with the aim of accurately working the track width Tw of a part of the second magnetic yoke 25 facing the medium (hereinafter referred to as upper pole 251), the magnetic yoke 25 is worked collectively from its surface by trimming until grooves are formed in the upper magnetic shield 23. With this construction, a predetermined narrow track width can be materialized accurately and spreading of recording magnetic field distribution generated from the gap 26 between the upper pole 251 and the upper shield 23 can be suppressed in the Tw direction and a medium magnetization pattern on the medium in which the recording side-fringing and the curving at the opposite ends are suppressed can be formed more effectively.

Figure 7:
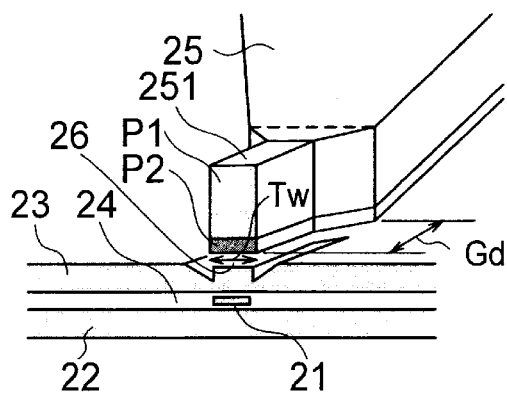

FIG. 7 shows an example in which as effective means for further suppressing the magnetic saturation at a part of the upper pole 251 facing the magnetic gap 26, a member is applied to a part P2 facing the gap 26, the member having a higher saturation magnetic flux density than that of the remaining part P1. This construction can further promote the aforementioned effects described in connection with FIG. 6.

Figure 8:
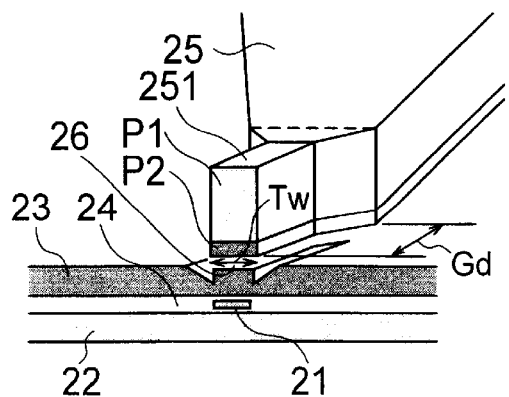

FIG. 8 shows an example which can further promote the effects of the examples of FIGS. 6 and 7 by applying the same high saturation magnetic flux density member as that for the part P2 shown in FIG. 6 to the upper shield 23.

Figure 9:
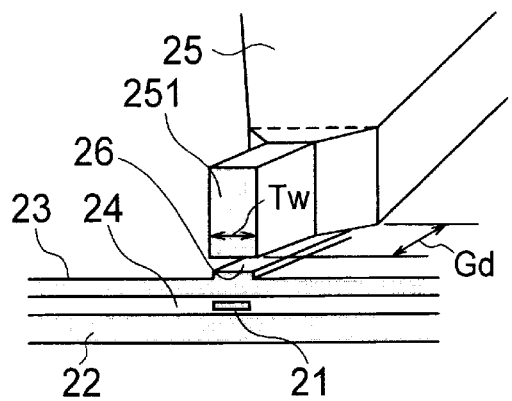
Figure 10:
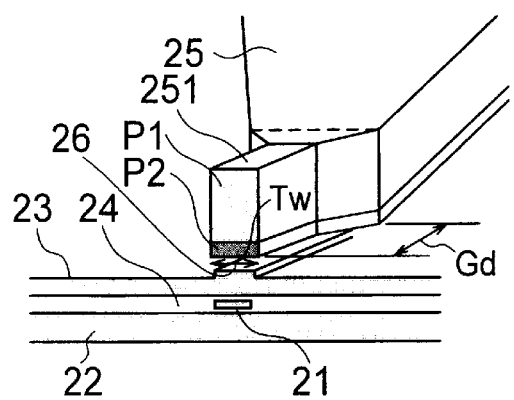
Figure 11:
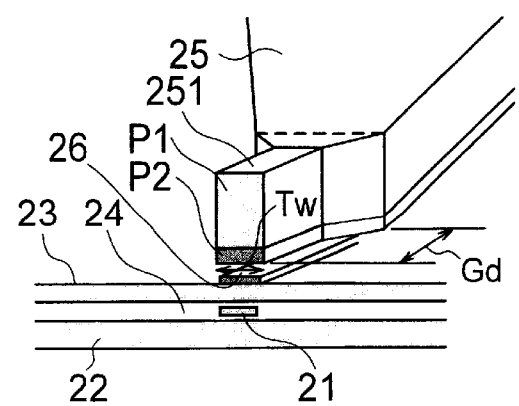

FIGS. 9 to 11 show structural examples to which different methods of working the track width of the upper pole and upper shield are applied to attain effects comparable to or higher than those attained with the examples of FIGS. 6 to 8. In these structural examples, the upper shield 23 has a projection facing the upper pole 251, so that spreading of recording magnetic field distribution generated from the gap 26 between the upper pole and the projection can be suppressed in the Tw direction. In an example of FIG. 10, like the FIG. 7 example, a part P2 facing the gap 26 is applied with a member having a higher saturation flux density than that of the remaining part P1.

In an example of FIG. 11, the projection of the upper shield 23 facing the magnetic gap 26 is also applied with the member having a higher saturation flux density.

Figure 12:
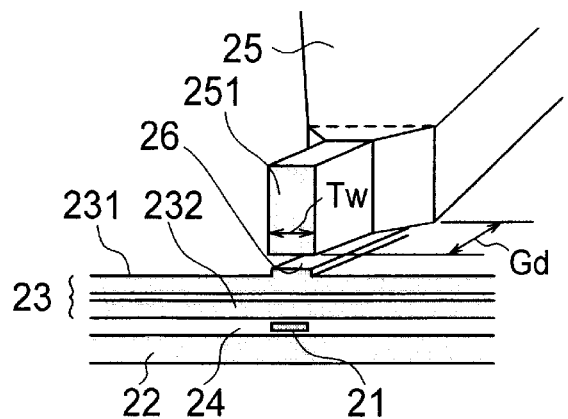
Figure 13:
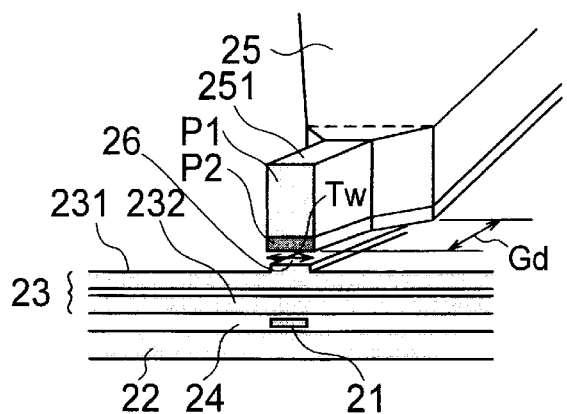
Figure 14:
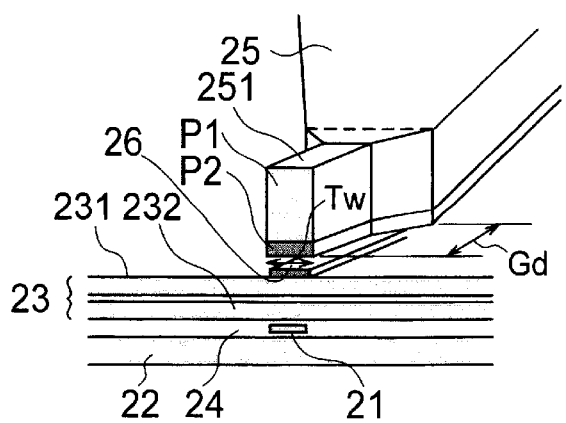

FIGS. 12 to 14 show modifications corresponding to the examples of FIGS. 9 to 11, respectively, and having additional advantages. Structurally, these modifications differ from the examples of FIGS. 6 to 11 in that the upper shield 23 is divided by an insulative member into a portion 231 facing the upper pole and a portion 232 facing the GMR or MR as well as the lower shield. With this construction, the influence of the recording magnetic field upon the MR/GMR during recording operation can be suppressed, thereby realizing a magnetic head exhibiting more stable reproduction performance.

Significantly, the present invention also features that the position at which the width of the second magnetic yoke starts to diverge (the position PH distant from the magnetic pole tip toward the conductor coil) can be determined by way of an easy and highly accurate method for photomask preparation or position adjustment during mask setting so as to achieve the intended improvements in recording and reproduction performance in the narrow track width head.

According to the foregoing embodiments, the thin film magnetic head having the recording head which can suppress the magnetic saturation at the opposite ends of width of the narrow track width to reduce the amount of the recording side-fringing onto the recording medium and can assure the necessary recording magnetic field satisfactorily can be provided and the magnetic disk apparatus carrying the magnetic head can also be provided.

While the invention has been particularly described and shown with reference to some embodiments thereof, it will be understood by those skilled in the art that various changes in form and detail and omissions may be made therein without departing from the scope of the invention. For example, the portion 231 facing the upper pole in FIGS. 12 to 14 may be replaced with the upper magnetic shield 23 of FIGS. 6 to 8 in which the grooves are formed by trimming.

What is claimed is:

1. A thin film magnetic head comprising:
   a first magnetic yoke having a first magnetic pole facing a magnetic recording medium;
   a second magnetic yoke having a second magnetic pole so disposed as to define a magnetic gap between the first magnetic pole and the second magnetic pole and forming at a rear portion of the second magnetic yoke a magnetic circuit which magnetically short-circuits to said first magnetic yoke;
   a conductor coil formed between said first and second magnetic yokes; and
   an insulating layer for insulating said conductor coil from said first and second magnetic yokes,
   wherein said second magnetic yoke has a magnetic gap depth over which the spacing of the magnetic gap defined between said first and second magnetic yokes keeps substantially equal toward the rear portion of said second magnetic yoke, starting at the tip of said second magnetic pole and, the spacing between said first and second magnetic yokes is increased toward the rear portion, starting at a position corresponding to the magnetic gap depth from the second magnetic pole tip, to house said conductor coil and said insulating layer;
   said second magnetic pole of said second magnetic yoke has a width in the track width direction for recording a signal on a track width of said recording medium;
   said width keeps constant over a predetermined length toward the rear portion, starting at the second magnetic pole tip and spreads monotonically toward the rear, starting at a spread start position corresponding to the predetermined length from the second magnetic pole tip; and
   said predetermined length terminating in the spread start position of said width of said second magnetic yoke is shorter than said magnetic gap depth.

2. A thin film magnetic head according to claim 1, wherein by adjusting said predetermined length terminating in said spread start position, the amount of induced write magnetic flux going round directly to said first and second magnetic yokes without passing through said recording medium is adjusted within a region of said magnetic gap depth so that saturation of the induced magnetic flux at opposite ends of track width of said second magnetic pole may be suppressed to reduce the amount of spreading of a recording magnetization pattern at opposite ends of track width on said recording medium.

3. A thin film magnetic head according to claim 2, wherein said predetermined length up to said spread start position is adjusted during photomask preparation or photomask setting.

4. A magnetic disk apparatus comprising:
   the thin film magnetic head as recited in claim 2;
   a pneumatic bearing floating slider in which said magnetic head is formed;
   an arm for supporting said slider;
   a controller for moving said arm to a predetermined position on a magnetic recording medium; and
   a signal processor for processing a recording/reproduction signal of said magnetic head.

5. A thin film magnetic head according to claim 1, wherein said first magnetic yoke has grooves to define said first magnetic pole at a part of said first magnetic yoke facing said second magnetic pole.

6. A thin film magnetic head according to claim 5, wherein said second magnetic pole and said grooves in said first magnetic yoke are formed by trimming through the same trimming process.

7. A thin film magnetic head according to claim 5, wherein a part of said second magnetic pole facing said first magnetic pole includes a magnetic material having a higher saturation flux density than that of the remaining part of said second magnetic pole.

8. A thin film magnetic head according to claim 7, wherein said first magnetic yoke inclusive of said first magnetic pole includes a magnetic material having a higher saturation flux density than that of said remaining part of said second magnetic pole.

9. A thin film magnetic head according to claim 1, wherein a part of said first magnetic yoke facing said second magnetic pole projects toward said second magnetic pole, said projecting part of said first magnetic yoke constituting said first magnetic pole.

10. A thin film magnetic head according to claim 9, wherein a part of said second magnetic pole facing said first magnetic pole includes a material having a higher saturation flux density than that of the remaining part of said second magnetic pole.

11. A thin film magnetic head according to claim 10, wherein said projecting first magnetic pole includes a magnetic material having a higher saturation magnetic flux density than that of said first magnetic yoke.

12. A thin film magnetic head according to claim 1 further comprising a shield disposed on the side of said first magnetic yoke opposite to said second magnetic yoke and a read head interposed between said first magnetic yoke and said shield, said first magnetic yoke including a third magnetic yoke disposed to face said second magnetic yoke and a fourth magnetic yoke disposed to face said read head while being electrically insulated from said third magnetic yoke.

13. A thin film magnetic head according to claim 12, wherein a part of said third magnetic yoke facing said second magnetic pole projects toward said second magnetic pole, said projecting part constituting said first magnetic pole.

14. A thin film magnetic head according to claim 13, wherein a part of said second magnetic pole facing said first magnetic pole includes a magnetic material having a higher saturation magnetic flux density than that of the remaining part of said second magnetic pole.

15. A thin film magnetic head according to claim 14, wherein said projecting first magnetic yoke includes a magnetic material having a higher saturation magnetic flux density than that of said third magnetic yoke.

16. A magnetic disk apparatus comprising:
   the thin film magnetic head as recited in claim 1;
   a pneumatic bearing floating slider in which said magnetic head is formed;
   an arm for supporting said slider;
   a controller for moving said arm to a predetermined position on a magnetic recording medium; and
   a signal processor for processing a recording/reproduction signal of said magnetic head.

17. A magnetic disk apparatus according to claim 16, wherein said first magnetic yoke has grooves to define said first magnetic pole at a part of said first magnetic yoke facing said second magnetic pole.

18. A magnetic disk apparatus according to claim 17, wherein a part of said second magnetic pole facing said first magnetic pole includes a magnetic material having a higher saturation magnetic flux density than that of the remaining part of said second magnetic pole.

19. A magnetic disk apparatus according to claim 18, wherein said first magnetic yoke inclusive of said first magnetic pole has a higher saturation magnetic flux density than that of said remaining part of said second magnetic pole.

20. A magnetic disk apparatus according to claim 19, wherein a part of said second magnetic pole facing said first magnetic pole includes a material having a higher saturation magnetic flux density than that of the remaining part of said second magnetic pole.

21. A magnetic disk apparatus according to claim 20, wherein said projecting first magnetic pole has a magnetic material having a higher saturation magnetic flux density than that of said first magnetic yoke.

22. A magnetic disk apparatus according to claim 16, further comprising a shield on the side of said first magnetic yoke opposite to said second magnetic yoke and a read head interposed between said first magnetic yoke and said shield, said first magnetic yoke including a third magnetic yoke disposed to face said second magnetic yoke and a fourth magnetic yoke disposed to face said read head while being electrically insulated from said third magnetic yoke.

23. A magnetic disk apparatus according to claim 22, wherein a part of said third magnetic yoke facing said second magnetic pole projects toward said second magnetic pole, said projecting part constituting said first magnetic pole.

24. A magnetic disk apparatus according to claim 23, wherein a part of said second magnetic pole facing said first magnetic pole includes a magnetic material having a higher saturation magnetic flux density than that of the remaining part of said second magnetic pole.

25. A magnetic disk apparatus according to claim 24, wherein said projecting first magnetic pole has a magnetic material having a higher saturation magnetic flux density than that of said third magnetic yoke.

26. A magnetic disk apparatus according to claim 17, wherein said second magnetic pole and said grooves in said first magnetic yoke are formed by trimming through a same trimming process.

27. A magnetic disk apparatus according to claim 16, wherein a part of said first magnetic yoke facing said second magnetic pole projects toward said second magnetic pole, said projecting part of said first magnetic yoke constituting said first magnetic pole.

* * * * *